US012786284B2

(12) United States Patent
Kohata

(10) Patent No.: US 12,786,284 B2
(45) Date of Patent: Nov. 3, 2026

(54) STORAGE MEDIUM STORING PROGRAM THAT CAN REDUCE COMMUNICATION LOAD OF DEVICE TOKEN, METHOD OF CONTROLLING INFORMATION PROCESSING APPARATUS, AND INFORMATION PROCESSING APPARATUS

(71) Applicant: CANON KABUSHIKI KAISHA, Tokyo (JP)

(72) Inventor: Toru Kohata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 19/008,501

(22) Filed: Jan. 2, 2025

(65) Prior Publication Data

US 2025/0227159 A1 Jul. 10, 2025

(30) Foreign Application Priority Data

Jan. 5, 2024 (JP) ................................ 2024-000696

(51) Int. Cl.
*H04L 67/55* (2022.01)

(52) U.S. Cl.
CPC .................................. *H04L 67/55* (2022.05)

(58) Field of Classification Search
CPC ...................................................... H04L 67/55
See application file for complete search history.

(56) References Cited

U.S. PATENT DOCUMENTS

2019/0363886 A1* 11/2019 Atwood .............. H04L 63/0807
2021/0195002 A1* 6/2021 Yamamoto .......... H04L 65/1045

FOREIGN PATENT DOCUMENTS

JP 2015-028792 2/2015
JP 2015028792 A * 2/2015

* cited by examiner

*Primary Examiner* — Suraj M Joshi
(74) *Attorney, Agent, or Firm* — Venable LLP

(57) ABSTRACT

A non-transitory computer-readable storage medium storing a program for causing a computer to execute a method of controlling an information processing apparatus in which an application has been installed. A host computer transmits a device token for identifying the application, acquired from a push notification management server, to a push notification request management server that issues a push notification to the host computer, based on the device token. The host computer acquires the latest device token from the push notification management server. The host computer transmits the latest device token to the push notification request management server in a case where the device token transmitted last time and the latest device token do not match, and does not transmit the latest device token to the push notification request management server in a case where the tokens match.

12 Claims, 11 Drawing Sheets

FIG. 4

```
{
    ”user_id” : “abcdef”,                  400
    ”region":“JP”,                        401
    ”language":“Japanese",                402
    ”osver":“13.0.1",                     403
    ”attached_printer":“Printer ABC",     404
    ”ink_level":“20",”30”,”40”,”80”       405
}
```

FIG. 5

```
#!/bin/bash
deviceToken={abcdefg1234567890}  501

read -r -d '' payload <<-'EOF'
{
 “main": {
   "alert": {
          “message": “my message"  502
   },
   "notification-data": {
        “image_url": "https://aaa.bbb.ccc.png"  503
   }
  }
}
EOF

curl
   --header "content-type: application/json"  504
   --header "push-type: background  505
   --header "topic: com.sample.app  506
   --header "expiration: 20230930  507
   --data   "payload"  508
   https://push.server.com/device/$deviceToken  509
```

*FIG. 6*

```
{
    "notification_id":“id_sample_aaa”, 601
    "notification_type":“inapp", 602
    "message":“my message", 603
    "image_url":“https://aaa.bbb.ccc.png", 604
    "end_datetime":“20230915", 605
    "priority":“1”, 606
}
```

*FIG. 9*

```
{
    ”user_id” : “abcdef”,  ~400
    ”region":“JP”,  ~401
    ”language":“Japanese",  ~402
    ”osver":“13.0.1",  ~403
    ”attached_printer":“Printer ABC",  ~404
    ”ink_level":“20",”30”,”40”,”80”  ~405
    ”device_token" : “abcdefg1234567890”  ~901
}
```

STORAGE MEDIUM STORING PROGRAM THAT CAN REDUCE COMMUNICATION LOAD OF DEVICE TOKEN, METHOD OF CONTROLLING INFORMATION PROCESSING APPARATUS, AND INFORMATION PROCESSING APPARATUS

BACKGROUND OF THE INVENTION

Field of the Invention

The present invention relates to a storage medium storing a program that can reduce a communication load of a device token, a method of controlling an information processing apparatus, and an information processing apparatus.

Description of the Related Art

As a technique of distributing information to an application, there is known a push notification. As a technique of realizing the push notification, there is known a technique in which a push notification request management server transmits a push notification distribution request to a push notification management server made available by an OS vendor, and the push notification management server distributes a push notification to a device and an application, as a notification destination indicated by the push notification distribution request (see e.g. Japanese Laid-Open Patent Publication (Kokai) No. 2015-28792). As an example of the push notification management server, windows push notification service (WNS) of Microsoft Corp. of the USA and Apple Push Notification service (APNs) of Apple Inc. of the USA are known.

For example, in a configuration in which a push notification is distributed to an application operating on mac OS (registered trademark) of Apple Inc. of the USA, the application operating on mac OS holds information indicating whether or not the application supports reception of a push notification. When an application supporting reception of a push notification (hereinafter referred to as the "push notification-supporting application") is started, the push notification-supporting application communicates with the APNs according to processing of the OS made available in advance. When this communication is successfully performed, the push notification-supporting application is enabled to acquire a character string, referred to as the device token, for uniquely identifying an application on a device from the APNs. With this, the application on this device is recognized by the APNs as the application of a push notification target. When issuing a push notification distribution request, this device token is required to be included in this push notification distribution request as information for identifying a notification target. Therefore, in the configuration using the push notification request management server, it is necessary to also notify the information of the device token to the push notification request management server.

Incidentally, according to Apple Inc., the information on the device token can be periodically changed, and when the device token is changed is not clear. Therefore, the push notification-supporting application is required to communicate with the APNs whenever the push notification-supporting application is started and always acquire the latest device token. Further, if the device token to be included in the push notification distribution request remains old, it is impossible to issue a push notification to the target application. For this reason, the push notification request management server that issues a push notification distribution request is required to always hold the latest device token. On the other hand, the device token provided by the APNs is not changed very frequently, and hence even when the device token is acquired whenever the push notification-supporting application is started, in most cases, the information on the acquired device token has not been changed. Thus, if the device token which is not changed very frequently is transmitted to the push notification request management server whenever the push notification-supporting application is started, there occurs a problem that the communication load of the push notification request management server is increased.

SUMMARY OF THE INVENTION

The present invention provides a mechanism that makes it possible to reduce the communication load when a push notification request management server acquires a device token.

In a first aspect of the present invention, there is provided a non-transitory computer-readable storage medium storing a program for causing a computer to execute a method of controlling an information processing apparatus in which an application has been installed, the method including causing the information processing apparatus to transmit first identification information which is first identification information acquired from a first server, for identifying the application, to a second server that issues a push notification to the information processing apparatus, based on the first identification information, and causing the information processing apparatus to execute a control process for performing control concerning second identification information generated by the first server after transmission of the first identification information, the control process including processing for acquiring the second identification information from the first server, and processing for transmitting the second identification information to the second sever in a case where the first identification information and the second identification information do not match, and not transmitting the second identification information to the second sever in a case where the first identification information and the second identification information match.

In a second aspect of the present invention, there is provided a method of controlling an information processing apparatus in which an application has been installed, including transmitting first identification information which is first identification information acquired from a first server, for identifying the application, to a second server that issues a push notification to the information processing apparatus, based on the first identification information, and performing control concerning second identification information generated by the first server after transmission of the first identification information, wherein the control includes acquiring the second identification information from the first server, and transmitting the second identification information to the second sever in a case where the first identification information and the second identification information do not match, and not transmitting the second identification information to the second sever in a case where the first identification information and the second identification information match.

According to the present invention, it is possible to reduce the communication load when the push notification request management server acquires a device token.

Further features of the present invention will become apparent from the following description of exemplary embodiments (with reference to the attached drawings).

BRIEF DESCRIPTION OF THE DRAWINGS

FIG. 4 is a diagram showing an example of attribute information generated by an attribute information generation section appearing in FIG. 3.

FIG. 5 is a diagram showing an example of a push notification request transmitted by a push notification request management server appearing in FIG. 1.

FIG. 6 is a diagram showing an example of information of a push notification acquired by a push notification acquisition section appearing in FIG. 3.

FIG. 9 is a diagram showing an example of attribute information including a device token.

DESCRIPTION OF THE EMBODIMENTS

The present invention will now be described in detail below with reference to the accompanying drawings showing embodiments thereof. Note that the present invention is not limited to the embodiments described below, and not all combinations of features described in the embodiments are absolutely essential to solution according to the invention.

Figure 1:
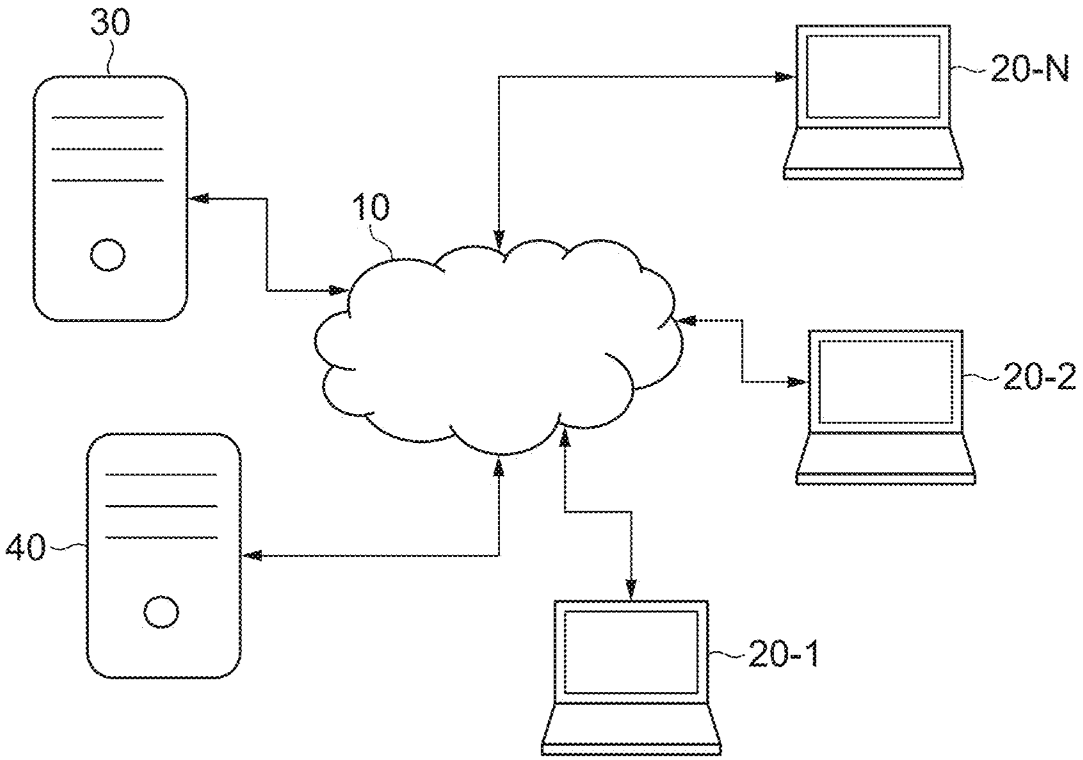
FIG. 1 is a configuration diagram of a push notification system including a host computer as an information processing apparatus according to the present embodiment.

FIG. 1 is a configuration diagram of a push notification system including a host computer 20-1 as an information processing apparatus according to the present embodiment. In this push notification system, the N host computers 20-1 to 20-N, a push notification management server 30 (first server), and a push notification request management server 40 (second server) can communicate with each other via the Internet.

The host computers 20-1 to 20-N each are e.g. a personal computer (PC). Note that the host computers 20-1 to 20-N each are not limited to a desktop-type PC but can be e.g. a laptop-type PC, a tablet-type PC, or a smartphone. In each of the host computers 20-1 to 20-N, an operating system (hereinafter referred to as the OS) has been installed. Further, the host computers 20-1 to 20-N each are equipped with a push notification-supporting application.

For example, when the push notification-supporting application is started on the host computer 20-1, the host computer 20-1 acquires a device token for the host computer 20-1 from the push notification management server 30. This device token is identification information formed by a predetermined character string for identifying the push notification-supporting application of the host computer 20-1 and the host computer 20-1. Further, the host computer 20-1 transmits the acquired device token to the push notification request management server 40. Further, the host computer 20-1 periodically transmits attribute information of the host computer 20-1 to the push notification request management server 40 at predetermined timings. This attribute information includes country information, language information, version information of the OS, information on a peripheral device connected to the host computer 20-1, and so forth. For example, in a case where the push notification-supporting application of the host computer 20-1 is an application for managing an image forming apparatus, the peripheral device information includes a model name of an image forming apparatus connected to the host computer 20-1, remaining amount information of ink or toner, and so forth.

Upon receipt of a notification distribution request from the outside, the push notification request management server 40 identifies a device indicated by the request and generates a push notification distribution request including the device token of the identified device. The push notification request management server 40 transmits the generated push notification distribution request to the push notification management server 30. The push notification management server 30 identifies a host computer associated with the device token included in the received notification distribution request from among the host computers 20-1 to 20-N, and it transmits (issues) a push notification to the identified host computer.

Figure 2:
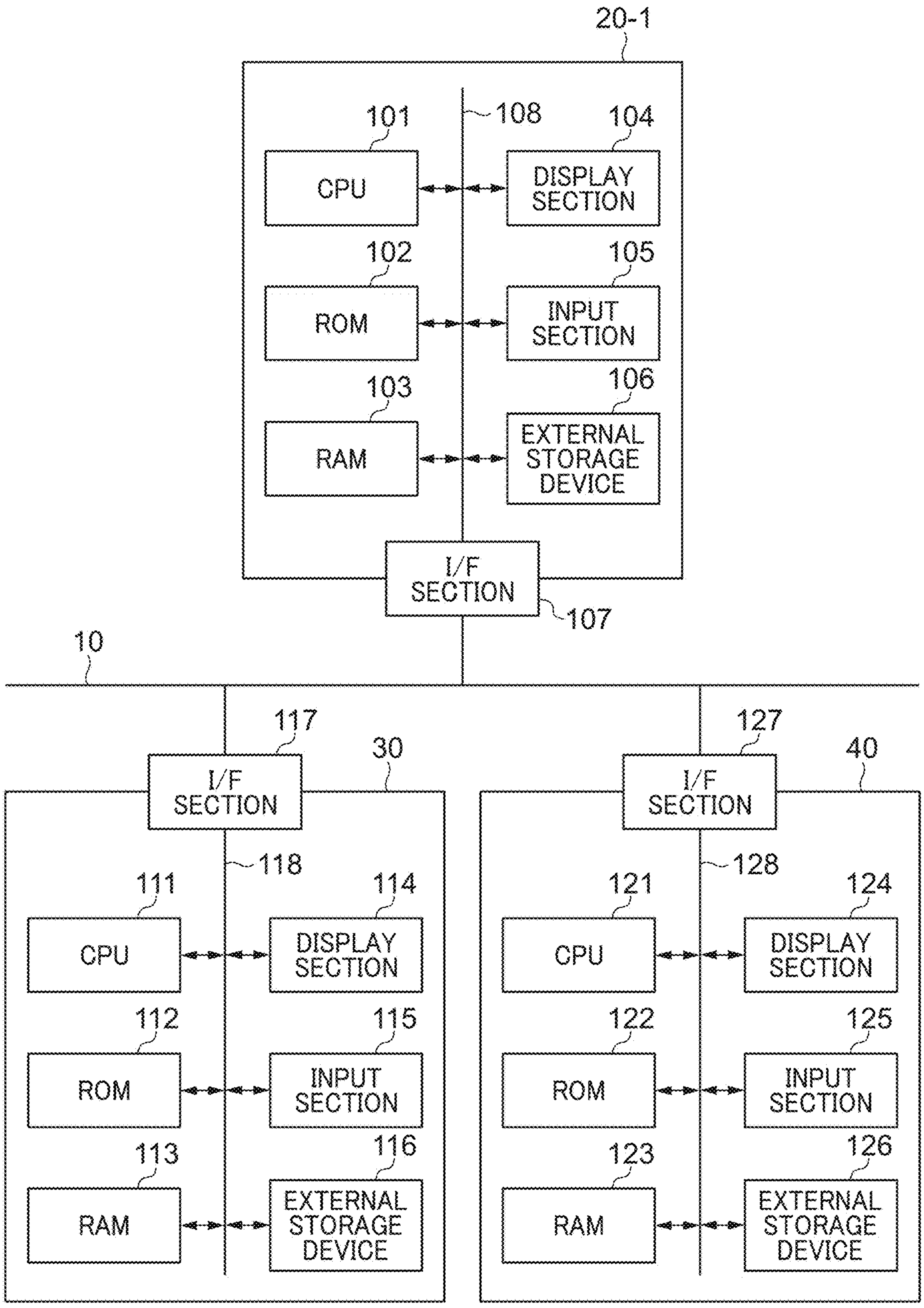
FIG. 2 is a block diagram schematically showing a hardware configuration of the push notification system shown in FIG. 1.

FIG. 2 is a block diagram schematically showing a hardware configuration of the push notification system shown in FIG. 1. Note that in the present embodiment, all of the host computers 20-1 to 20-N have the same configuration, and hence the following description will be given of the configuration of the host computer 20-1, by way of example.

Referring to FIG. 2, the host computer 20-1 includes a CPU 101, a ROM 102, a RAM 103, a display section 104, an input section 105, an external storage device 106, and an I/F section 107. These are interconnected via a bus 108. Note that I/F is an abbreviation of interface.

The CPU 101 is a central processing unit that controls the components of the host computer 20-1 and executes control programs, such as an OS and applications. The ROM 102 is a random access memory storing the control programs. The RAM 103 is a random access memory including a work area for the CPU 101. The external storage device 106 stores a variety of control programs including the applications. The input section 105 is an input device, such as a keyboard and a mouse, for operating the host computer 20-1. The display section 104 is a display device that performs the display for confirming information input by using the input section 105 or the display of user interface screens of the OS and the applications, a message, and so forth. The I/F section 107 is a communication module for transmitting and receiving data to and from the push notification management server 30 and the push notification request management server 40.

The push notification management server 30 includes a CPU 111, a ROM 112, a RAM 113, a display section 114, an input section 115, an external storage device 116, and an I/F section 117. These are interconnected via a bus 118. The CPU 101 is a central processing unit that controls the components of the push notification management server 30. The ROM 112 is a read only memory and stores programs for controlling the system and applications in the push notification management server 30. The RAM 113 is a random writing and reading memory and temporarily stores programs necessary for the operations of the system and the applications in the push notification management server 30, a device token generated for the host computer 20-1, and so forth. The input section 115 is an input device, such as a keyboard and a mouse, for operating the push notification management server 30. The display section 114 is a display device that performs the display for confirming information input by using the input section 115 or the display of user interface screens of the OS and the applications, a message, and so forth. The I/F section 117 is a communication module for transmitting and receiving data to and from the host computers 20-1 to 20-N and the like.

The push notification request management server 40 includes a CPU 121, a ROM 122, a RAM 123, a display section 124, an input section 125, an external storage device 126, and an I/F section 127. These are interconnected via a bus 128. The CPU 121 is a central processing unit that controls the components of the push notification request management server 40. The ROM 122 is a read only memory and stores programs for controlling the system and applications in the push notification request management server 40. The RAM 123 is a random writing and reading memory. The RAM 123 temporarily stores programs necessary for the operations of the system and the applications in the push notification request management server 40, a device token received from the host computer 20-1, the attribute information of the host computer 20-1, and so forth. The input section 125 is an input device, such as a keyboard and a mouse, for operating the push notification request management server 40. The display section 124 is a display device that performs the display for confirming information input by using the input section 125 or the display of user interface screens of the OS and the applications, a message, and so forth. The I/F section 127 is a communication module for transmitting and receiving data to and from the host computers 20-1 to 20-N.

Figure 3:
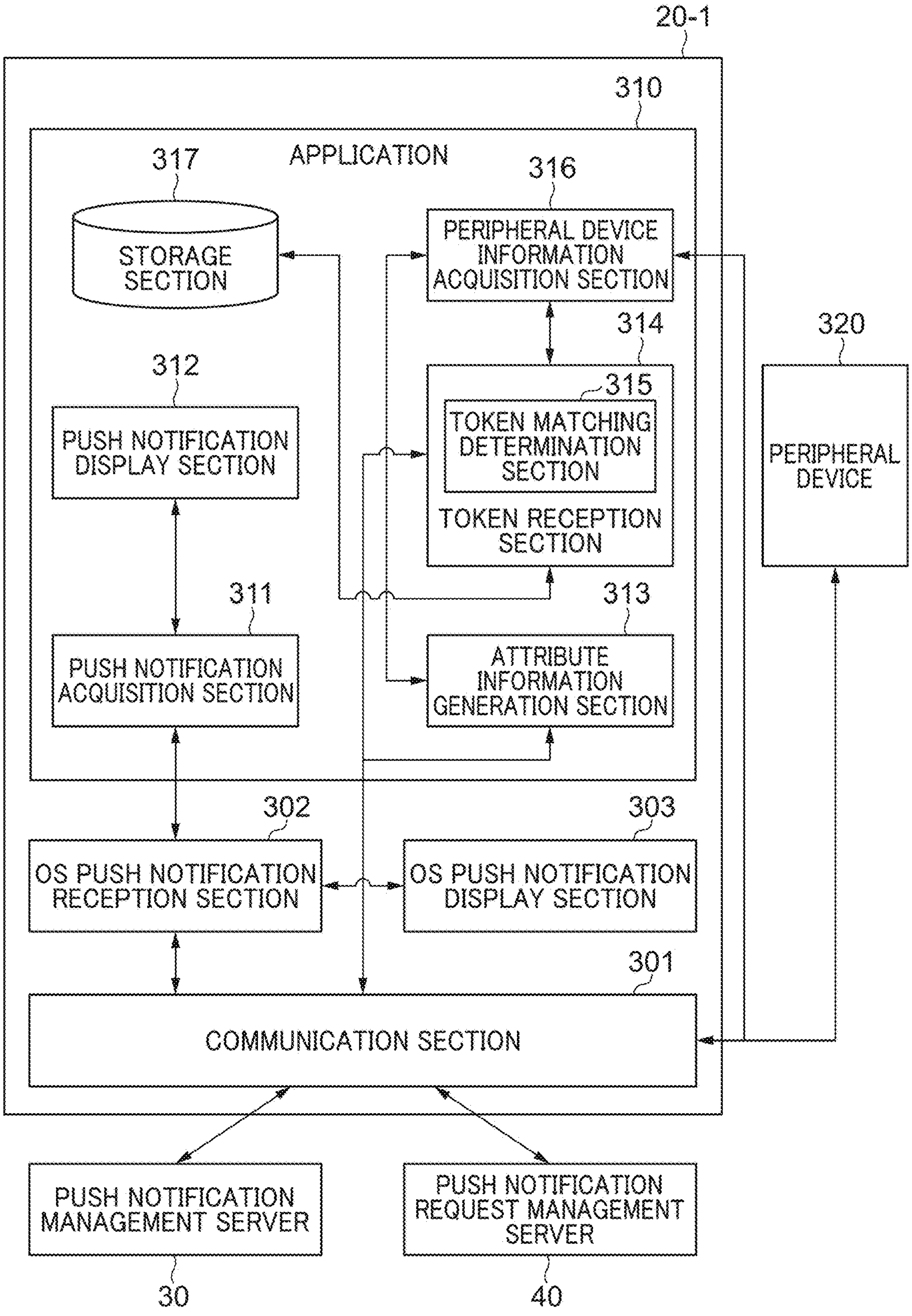
FIG. 3 is a block diagram schematically showing a software configuration of the host computer appearing in FIG. 1.

FIG. 3 is a block diagram schematically showing a software configuration of the host computer 20-1 appearing in FIG. 1. As shown in FIG. 3, the host computer 20-1 is equipped with a communication section 301, an OS push notification reception section 302, and an OS push notification display section 303, as software. Further, as software, the host computer 20-1 is equipped with an application 310 which is a push notification-supporting application. The application 310 includes a push notification acquisition section 311, a push notification display section 312, an attribute information generation section 313, a token reception section 314, a token match determination section 315, a peripheral device information acquisition section 316, and a storage section 317. The host computer 20-1 communicates with the push notification management server 30, the push notification request management server 40, and a peripheral device 320, which are external apparatuses, by the processing of the communication section 301, so as to exchange information therewith.

In the host-computer 20-1, when the application 310 is started, the token reception section 314 communicates with the push notification management server 30 via the communication section 301. When this communication is successfully performed, the token reception section 314 receives a device token of the host computer 20-1 from the push notification management server 30. This device token is, as mentioned above, identification information formed by a predetermined character string for identifying the host computer 20-1 and the application 310. The device token is transmitted to the push notification request management server 40 via the communication section 301. With this, the application 310 is recognized by the push notification management server 30 and the push notification request management server 40 as the push notification target. At this time, the token reception section 314 stores the device token which has been successfully transmitted to the push notification request management server 40 in the storage section 317. The device token stored in the storage section 317 is used in determination processing performed by the token match determination section 315 e.g. when the application 310 is started the next time. Note that details of the determination processing performed by the token match determination section 315 will be described hereinafter.

In the host-computer 20-1, when the application 310 is started, the attribute information generation section 313 generates attribute information of the host computer 20-1 and the application 310. The generated attribute information is transmitted to the push notification request management server 40 via the communication section 301. Note that in the attribute information, information on the peripheral device 320 connected to the host computer 20-1 can be also included. In this case, the peripheral device information acquisition section 316 acquires the information on the peripheral device 320 via the communication section 301.

FIG. 4 is a diagram showing an example of the attribute information generated by the attribute information generation section 313 appearing in FIG. 3. The attribute information includes a user identifier (ID) 400, country information 401, language information 402, OS version information 403, a model name 404 of an image forming apparatus connected to the host computer 20-1, and ink remaining amount information 405 of the image forming apparatus. By transmitting the attribute information to the push notification request management server 40, the push notification request management server 40 is enabled to transmit a push notification only to a notification destination associated with the received attribute information. For example, when desired to distribute a push notification only to users in Japan, the push notification request management server 40 identifies a device having the country information 401 set as JP out of the host computers 20-1 to 20-N. Thus, the push notification request management server 40 can transmit a push notification request for the identified device to the push notification management server 30. Further, this attribute information can be configured to be periodically transmitted to the push notification request management server 40 not only when the application 310 is started but also at predetermined timings. By thus periodically transmitting the attribute information, it is possible to periodically notify the latest attribute information to the push notification request management server 40.

FIG. 5 is a diagram showing an example of the push notification request transmitted by the push notification request management server 40 appearing in FIG. 1. The push notification request includes a device token portion 501, a message portion 502, an image uniform resource locator (URL) portion 503, a data format-specifying portion 504, and a notification type-specifying portion 505. Further, the push notification request includes a notification target application-specifying portion 506, an expiration date portion 507, a data portion 508, and a push notification management server-specifying portion 509.

The device token portion 501 is information for identifying a device and an application as the transmission destination of the push notification. The device token portion 501 is finally used as part of information on the push notification management server-specifying portion 509. The message portion 502 and the image URL portion 503 are contents of data transmitted as the push notification and are part of the data portion 508. Further, the data format-specifying portion 504 is information indicating a format of data to be transmitted as the push notification. The notification type-specifying portion 505 is information indicating either a notification for displaying on a push notification-displaying area of the OS or a notification for not displaying on the push notification-displaying area of the OS. The notification target application-specifying portion 506 is information indicating an ID of an application as a notification target. The notification target application-specifying portion 506 is basically unchanged when transmitting a push notification to any device but is required to be changed together with the device token portion 501, on a request-by-request basis, in a case where the push notification is transmitted to a plurality of applications. The expiration date portion 507 is information indicating an expiration date of display of the push notification. In a case where a push notification of information which is valid only for a predetermined time period, such as campaign information, is transmitted, by setting an expiration date, the push notification can be displayed only for the predetermined time period when the push notification is displayed on the host computer 20-1. The data portion 508 is the contents of data transmitted as the push notification. Note that although FIG. 5 shows an example that the JavaScript Object Notation (JSON) format is specified in the data format-specifying portion 504 and the data portion 508, a data format other than the JSON format can be used insofar as it is a data format supported by the push notification management server 30. The push notification management server-specifying portion 509 is a URL of the push notification management server 30 that transmits a request, and it includes the information on the device token portion 501.

The push notification management server 30 transmits the information on the push notification to a device associated with a device token included in the received push notification request, such as the host computer 20-1. The information on the push notification, which has been transmitted from the push notification management server 30, is first received by the OS push notification reception section 302 via the communication section 301. The information on the push notification received here includes the information indicating either a notification for displaying on the push notification-displaying area of the OS or a notification for not displaying on the push notification-displaying area of the OS. In a case where the information indicating a notification for displaying on the push notification-displaying area of the OS is included, the push notification is displayed based on the received information by the OS push notification display section 303. On the other hand, the information indicating a notification for not displaying on the push notification-displaying area of the OS is included, the push notification is not displayed based on the received information by the OS push notification display section 303. In this case, the information on the push notification can be acquired by the application 310 which has been started, and it can be used for the push notification display performed by the application 310. The push notification acquisition section 311 and the push notification display section 312 are included in the application 310. As mentioned above, when the application 310 is started, the push notification acquisition section 311 checks whether there is no information on a push notification that can be acquired. At this time, the push notification acquisition section 311 can acquire the information on a push notification, regardless of whether the information is a notification for displaying on the OS push notification-displaying area or a notification for not displaying on the OS push notification-displaying area. FIG. 6 shows an example of the information on this push notification. In the illustrated example in FIG. 6, the information on the push notification includes a push notification ID portion 601, a push notification type portion 602, a push notification message portion 603, a push notification image URL portion 604, a push notification expiration date portion 605, and a push notification priority portion 606. The push notification display section 312 of the application 310 displays the push notification based on the received information on the push notification. For example, in a case where the push notification type portion 602 is "inapp" indicating display in the application, the push notification is displayed not by the OS push notification display section 303, but by the application 310. Further, as a message displayed in the push notification, a message stored in the push notification message portion 603 can be displayed, or an image file can be downloaded from an image file URL indicated in the push notification image URL portion 604 and be displayed. These processing operations for customizing the contents of the push notification are performed by the push notification display section 312 of the application 310. Further, it is also possible to display the push notification only within the expiration date of the notification, which is written in the push notification expiration date portion 605, and control the display priority, in a case where a plurality of push notifications can be successfully simultaneously received, based on the information in the push notification priority portion 606. These processing operations for displaying the push notification are performed by the push notification display section 312 of the application 310.

Figure 7:
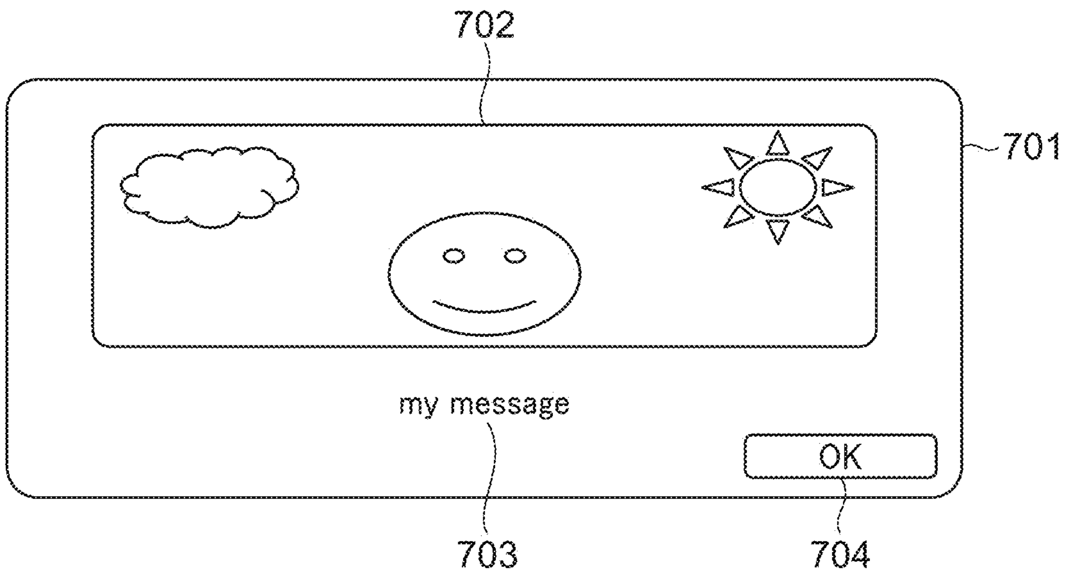
FIG. 7 is a diagram showing an example of a push notification displayed by a push notification display section appearing in FIG. 3.

FIG. 7 is a diagram showing an example of the push notification displayed by the push notification display section 312 appearing in FIG. 3. The push notification display section 312 displays an in-application push notification window 701 and displays the contents based on the information on the push notification in the in-application push notification window 701. An image displayed in a push notification window image portion 702 is an image acquired by the push notification display section 312 from the push notification image URL portion 604. Further, a message displayed in a push notification window message portion 703 is a message acquired by the push notification display section 312 from the push notification message portion 603. Further, an OK button 704 for closing the push notification window is also displayed by the push notification display section 312.

Next, reception of the device token, which is performed when the application 310 is started, will be described.

Figure 8:
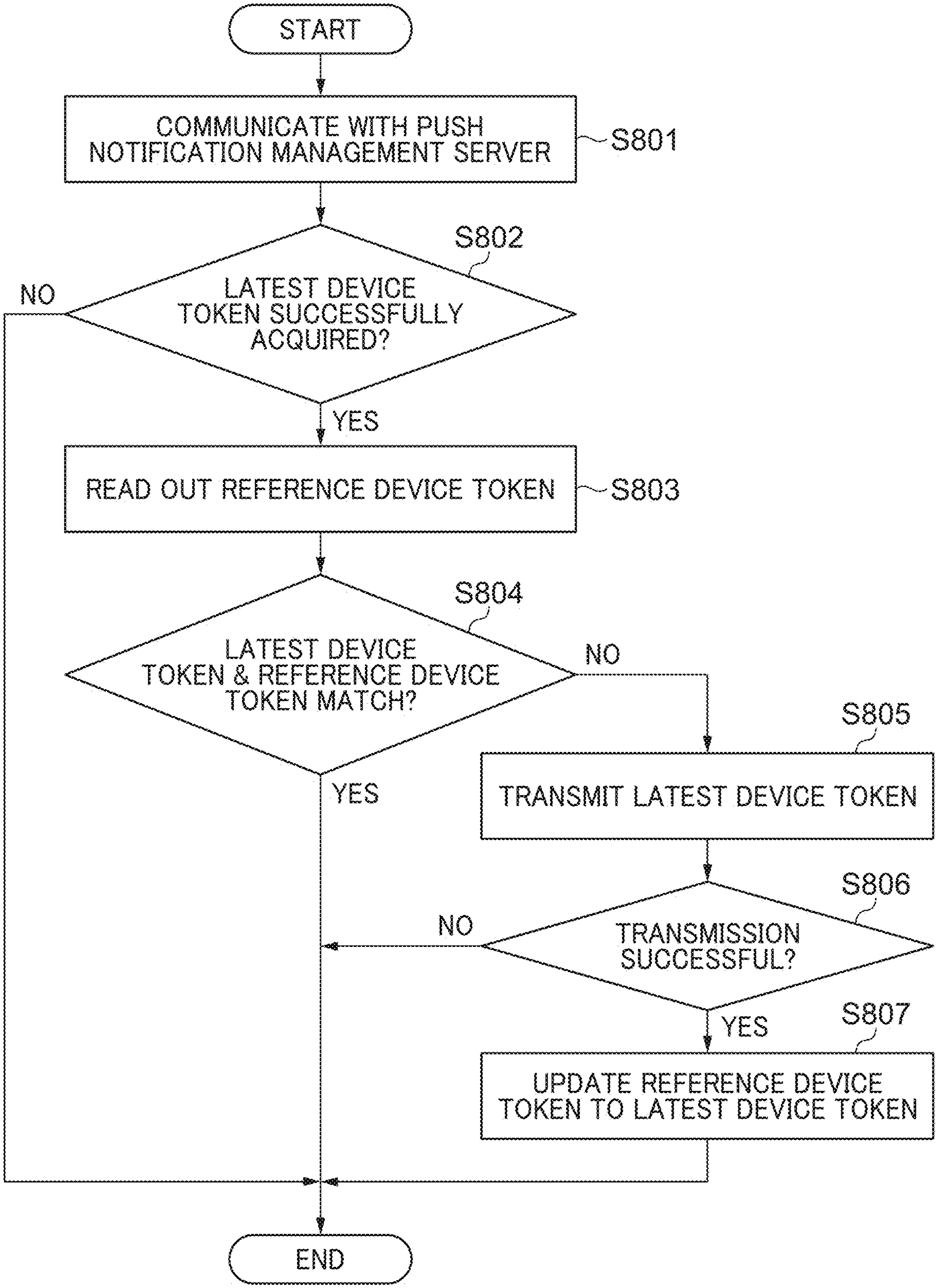
FIG. 8 is a flowchart of a device token reception control process performed by the host computer appearing in FIG. 1.

FIG. 8 is a flowchart of a device token reception control process performed by the host computer 20-1 appearing in FIG. 1. The device token reception control process is realized by the CPU 101 executing a program stored in the ROM 102 or the like. The device token reception control process is executed e.g. when the application 310 is started for the second or subsequent time. Note that in this device token reception control process, it is assumed that the device token transmitted from the host computer 20-1 to the push notification request management server 40 last time has already been stored in the storage section 317 as a reference device token.

Referring to FIG. 8, first, the CPU 101 controls the token reception section 314 to communicate with the push notification management server 30 (S801). Then, the CPU 101 determines whether or not the device token has been successfully acquired from the push notification management server 30 (S802). If it is determined in the step S802 that acquisition of the device token has failed, the present process is terminated. If it is determined in the step S802 that the device token has been successfully acquired, the present process proceeds to a step S803. Note that the device token obtained by performing communication with the push notification management server 30 in the step S801 is hereinafter referred to as the "latest device token".

In the step S803, the CPU 101 reads out the reference device token stored in the storage section 317. Then, the CPU 101 controls the token match determination section 315 to determine whether or not the latest device token and the reference device token match (S804).

If it is determined in the step S804 that the latest device token and the reference device token match, the present process is terminated.

On the other hand, if it is determined in the step S804 that the latest device token and the reference device token do not match, the present process proceeds to a step S805. In the step S805, the CPU 101 transmits the latest device token to the push notification request management server 40 via the communication section 301.

Then, the CPU 101 determines whether or not the latest device token has been successfully transmitted (S806). If it is determined in the step S806 that transmission of the latest device token has failed, the present process is terminated. Note that in a case where it is determined in the step S806 that transmission of the latest device token has failed, this means that communication with the push notification request management server 40 has failed due to some reason. Therefore, a message to the effect that communication with the push notification request management server 40 has failed can be displayed on the display section 104. Further, when communication with the push notification request management server 40 has been enabled, the processing for transmitting the latest device token to the push notification request management server 40 can be performed.

On the other hand, if it is determined in the step S806 that the latest device token has been successfully transmitted, the CPU 101 updates the reference device token stored in the storage section 317 to the latest device token (S807). Then, the present process is terminated.

According to the above-described embodiment, in a case where the reference device token and the latest device token match, the latest device token is not transmitted to the push notification request management server 40. That is, the device token (reference device token) held by the push notification request management server 40 has not been updated, unnecessary transmission of the device token to the push notification request management server 40 is not performed. This makes it possible to reduce the communication load applied when the push notification request management server 40 acquires the device token.

Further, in the above-described embodiment, the reference device token is the device token transmitted to the push notification request management server 40 last time. With this, in a case where the latest device token has not been updated by the device token transmitted to the push notification request management server 40 last time, it is possible to prevent unnecessary transmission of the device token to the push notification request management server 40.

Further, in the above-described embodiment, the device token reception control process performed by the host computer 20-1 is executed when the application 310 indicated by the reference device token is started. With this, it is possible to reduce the communication load applied when the push notification request management server 40 acquires the device token at the time of starting the application 310.

Further, although the above-described device token reception control process in FIG. 8 has been described as a process executed when the application 310 is started for the second or subsequent time, the execution timing of the device token reception control process is not limited to this. For example, the device token reception control process can be periodically executed at predetermined timings during operation of the application 310.

Further, the device token reception control process can be executed when a predetermined event occurs in the host computer 20-1.

Note that although in the above-described embodiment, the description is given of a configuration in which the reference device token is updated only in a case where it is determined that the latest device token and the reference device token do not match, this is not limitative. For example, the reference device token can also be updated to the latest device token also in a case where it is determined that the latest device token and the reference device token match. That is, the reference device token is updated to the latest device token regardless of whether the latest device token and the reference device token match. In this configuration, in the step S804, the latest device token and the device token (reference device token) acquired from the push notification management server 30 when the application was started last time are compared. In this configuration as well, it is possible to obtain the same advantageous effect as provided by the above-described embodiment.

Further, in the present embodiment, the latest device token can be added to the attribute information of the host computer 20-1, which is periodically transmitted to the push notification request management server 40 at predetermined timings.

The attribute information generation section 313 generates the attribute information of the host computer 20-1 and transmits this attribute information to the push notification request management server 40 via the communication section 301. In the present embodiment, the latest device token is added to this attribute information.

FIG. 9 is a diagram showing an example of the attribute information including a device token. This attribute information includes not only the above-mentioned user ID 400, country information 401, language information 402, OS version information 403, model name 404 of the image forming apparatus connected to the host computer 20-1, and ink remaining amount information 405 of the image forming apparatus, but also a device token 901. The device token 901 is added to the attribute information in a case where it is necessary to notify the device token 901 to the push notification request management server 40 but is not added to attribute information in a case where it is unnecessary to notify the device token 901 to the push notification request management server 40. By transmitting the attribute information including the device token 901 to the push notification request management server 40, the push notification request management server 40 can not only transmit a push notification only to a notification destination associated with the received attribute information, but it also can identify a device and an application as the request target.

Figure 10:
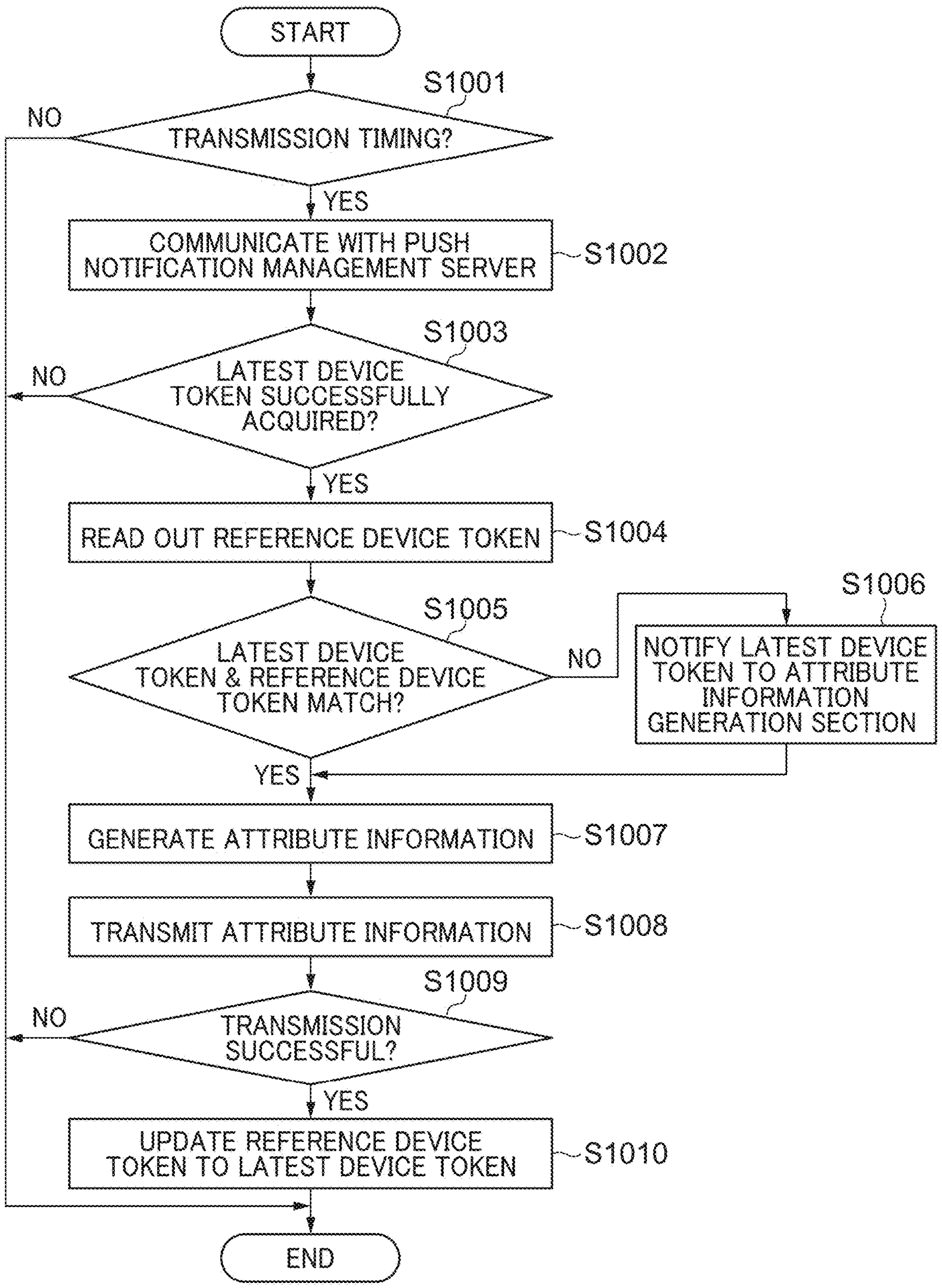
FIG. 10 is a flowchart of a variation of the device token reception control process performed by the host computer appearing in FIG. 1.

FIG. 10 is a flowchart of a variation of the device token reception control process performed by the host computer 20-1 appearing in FIG. 1. Similar to the above-described device token reception control process in FIG. 8, the device token reception control process in FIG. 10 is realized by the CPU 101 executing a program stored in the ROM 102 or the like. Further, the device token reception control process in FIG. 10 is executed after the application 310 is started and the above-described device token reception control process in FIG. 8 is completed. That is, the device token reception control process in FIG. 10 is executed during operation of the application 310.

Referring to FIG. 10, first, the CPU 101 determines whether or not it is the timing, set in advance, of transmitting the attribute information (S1001). The attribute information transmission timing is, for example, once a month or once three months, which can be changed on a menu of the application 310 by a user. Note that the attribute information transmission timing is not limited to the timing set by a user, but, for example, the attribute information transmission timing can be when there is a change in a printer status associated with the attribute information or the like. The setting of the attribute information transmission timing is held, e.g., by the attribute information generation section 313.

If it is determined in the step S1001 that it is not the attribute information transmission timing, the present process is terminated. If it is determined in the step S1001 that it is the attribute information transmission timing, the CPU 101 controls the token reception section 314 to communicate with the push notification management server 30 (S1002). Then, the CPU 101 determines whether or not the latest device token has been successfully acquired from the push notification management server 30 (S1003).

If it is determined in the step S1003 that acquisition of the latest device token from the push notification management server 30 has failed, the present process is terminated. If it is determined in the step S1003 that the latest device token has been successfully acquired from the push notification management server 30, the CPU 101 reads out the reference device token stored in the storage section 317 (S1004). Then, the CPU 101 determines whether or not the latest device token and the reference device token match (S1005).

If it is determined in the step S1005 that the latest device token and the reference device token do not match, the CPU 101 notifies the latest device token to the attribute information generation section 313 (S1006). Then, the CPU 101 controls the attribute information generation section 313 to generate the attribute information (S1007). At this time, in the step S1007, as shown in FIG. 9, the attribute information 400 including the notified latest device token 901 is generated. Thus, in the present embodiment, in a case where the latest device token and the reference device token do not match, the attribute information 400 including the latest device token 901 is generated. Then, the present process proceeds to a step S1008.

If it is determined in the step S1005 that the latest device token and the reference device token match, the step S1007 is executed without executing the step S1006. At this time, in the step S1007, as shown in FIG. 4, the attribute information 400 without the acquired latest device token is generated. Then, the present process proceeds to the step S1008.

In the step S1008, the CPU 101 transmits the attribute information generated in the step S1007 to the push notification request management server 40. Then, the CPU 101 determines whether or not the attribute information has been successfully transmitted (S1009). If it is determined in the step S1009 that transmission of the attribute information has failed, the present process is terminated. Note that in a case where it is determined in the step S1009 that transmission of the attribute information has failed, this means that communication with the push notification request management server 40 has failed due to some reason. Therefore, a message to the effect that communication with the push notification request management server 40 has failed can be displayed on the display section 104, and when communication with the push notification request management server 40 has been enabled, the processing for transmitting the attribute information to the push notification request management server 40 can be performed.

On the other hand, if it is determined in the step S1009 that the attribute information has been successfully transmitted, the CPU 101 updates the reference device token stored in the storage section 317 to the latest device token (S1010). Then, the present process is terminated.

In the above-described embodiment, one data including the attribute information of the host-computer 20-1 and the latest device token is transmitted to the push notification request management server 40. This makes it possible to reduce an amount of data received by the push notification request management server 40 compared with a case where the attribute information of the host-computer 20-1 and the latest device token are transmitted as separate data items, and therefore, as a result, it is possible to reduce the communication load of the push notification request management server 40.

Further, in the above-described embodiment, the device token reception control process performed by the host computer 20-1 is executed at a predetermined timing set in advance during operation of the application 310. With this, in the configuration in which the latest device token is acquired from the push notification management server 30 at a predetermined timing set in advance during operation of the application 310, it is possible to reduce the communication load of the push notification request management server 40.

Further, in the above-described embodiment, the device token reception control process performed by the host computer 20-1 is executed when the attribute information is changed during operation of the application 310. With this, in the configuration in which the latest device token is acquired from the push notification management server 30 at a timing when the attribute information is changed during operation of the application 310, it is possible to reduce the communication load of the push notification request management server 40.

Further, in the above-described embodiment, the latest device token and the reference device token can be compared when a device token request is received from the push notification request management server 40.

Figure 11:
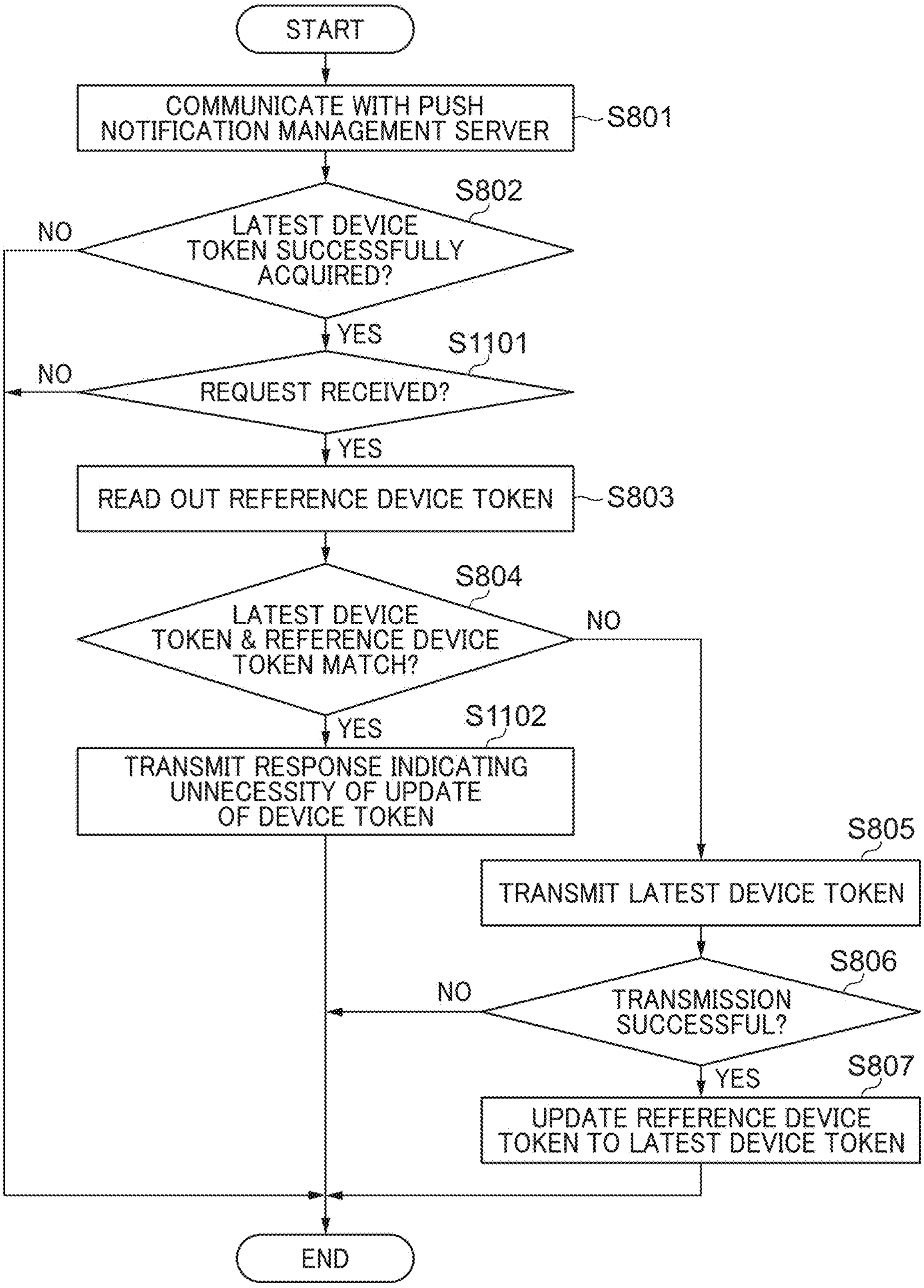
FIG. 11 is a flowchart of another variation of the device token reception control process performed by the host computer appearing in FIG. 1.

FIG. 11 is a flowchart of another variation of the device token reception control process performed by the host computer 20-1 appearing in FIG. 1. Note that the device token reception control process in FIG. 11 is a process similar to the above-described device token reception control process in FIG. 8, and hence the following description will be given of a different point from the above-described device token reception control process in FIG. 8. Similar to the above-described device token reception control process in FIG. 8, the device token reception control process in FIG. 11 is also realized by the CPU 101 executing a program stored in the ROM 102 or the like. Similar to the above-described device token reception control process in FIG. 8, the device token reception control process in FIG. 11 is also executed e.g. when the application 310 is started for the second or subsequent time. Note that in the device token reception control process in FIG. 11 as well, it is assumed that the device token transmitted from the host computer 20-1 to the push notification request management server 40 last time has already been stored in the storage section 317 as the reference device token.

Referring to FIG. 11, first, the above-described S801 and S802 are executed. If it is determined in the step S802 that acquisition of the device token has failed, the present process is terminated. If it is determined in the step S802 that the device token has been successfully acquired, the present process proceeds to a step S1101.

In the step S1101, the CPU 101 determines whether or not a device token request has been received from the push notification request management server 40. If it is determined in the step S1101 that no device token request has been received from the push notification request management server 40, the present process is terminated. If it is determined in the step S1101 that a device token request has been received from the push notification request management server 40, the above-described S803 and S804 are executed.

If it is determined in the step S804 that the latest device token and the reference device token do not match, the above-described steps S805 and S806 are executed. If it is determined in the step S806 that transmission of the latest device token has failed, the present process is terminated. If it is determined in the step S806 that the latest device token has been successfully transmitted, the above-described S807 is executed, followed by terminating the present process.

If it is determined in the step S804 that the latest device token and the reference device token match, the CPU 101 transmits a response to the effect that update of the device token is not required, to the push notification request management server 40 (S1102). After that, the present process is terminated. Note that from a point of view of the communication frequency, transmission of the response in the step S1102 is not necessarily required. In the configuration in which transmission of the response in the step S1102 is not performed, in a case where a response to the device token request has not been received even when a predetermined time period has elapsed, the push notification request management server 40 determines that update of the device token is not needed.

In the above-described embodiment, the device token reception control process performed by the host computer 20-1 is executed in a case where the host computer 20-1 receives a device token request from the push notification request management server 40. With this, in the configuration in which the host computer 20-1 acquires the latest device token from the push notification management server 30 when the host computer 20-1 receives a device token request from the push notification request management server 40, it is possible to reduce the communication load of the push notification request management server 40.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-000696 filed Jan. 5, 2024, which is hereby incorporated by reference herein in its entirety.

What is claimed is:

1. A non-transitory computer-readable storage medium storing a program for causing a computer to execute a method of controlling an information processing apparatus in which an application has been installed, the method comprising:

causing the information processing apparatus to transmit first identification information which is first identification information acquired from a first server, for identifying the application, to a second server that issues a push notification to the information processing apparatus, based on the first identification information; and causing the information processing apparatus to execute a control process for performing control concerning second identification information generated by the first server after transmission of the first identification information, the control process including processing for acquiring the second identification information from the first server, and processing for transmitting the second identification information to the second sever in a case where the first identification information and the second identification information do not match, and not transmitting the second identification information to the second sever in a case where the first identification information and the second identification information match.

2. The storage medium according to claim 1, wherein the control process further includes processing for comparing the first identification information and the second identification information.

3. The storage medium according to claim 1, wherein the first identification information is identification information transmitted to the second server last time.

4. The storage medium according to claim 1, wherein the first identification information is identification information acquired from the first server last time.

5. The storage medium according to claim 1, wherein the control process is executed when an application indicated by the first identification information is started.

6. The storage medium according to claim 1, wherein the control process is executed when the information processing apparatus receives a request of the second identification information from the second server.

7. The storage medium according to claim 1, wherein the control process further includes processing for transmitting attribute information of the information processing apparatus, which is used for determining a transmission destination of the push notification, to the second server.

8. The storage medium according to claim 7, wherein in the control process, one data including the attribute information of the information processing apparatus and the second identification information is transmitted to the second server.

9. The storage medium according to claim 1, wherein the control process is executed at a predetermined timing set in advance during operation of the application indicated by the first identification information.

10. The storage medium according to claim 1, wherein the control process is executed at a timing when the attribute information of the information processing apparatus is changed during operation of the application indicated by the first identification information.

11. A method of controlling an information processing apparatus in which an application has been installed, comprising:

transmitting first identification information which is first identification information acquired from a first server, for identifying the application, to a second server that issues a push notification to the information processing apparatus, based on the first identification information; and performing control concerning second identification information generated by the first server after transmission of the first identification information, wherein the control includes:

acquiring the second identification information from the first server; and transmitting the second identification information to the second sever in a case where the first identification information and the second identification information do not match, and not transmitting the second identification information to the second sever in a case where the first identification information and the second identification information match.

12. An information processing apparatus in which an application has been installed, comprising:

a transmission unit configured to transmit first identification information which is first identification information acquired from a first server, for identifying the application, to a second server that issues a push notification to the information processing apparatus, based on the first identification information; and a control unit configured to perform control concerning second identification information generated by the first server after transmission of the first identification information, wherein the control unit acquires the second identification information from the first server, and transmits the second identification information to the second sever in a case where the first identification information and the second identification information do not match, and does not transmit the second identification information to the second sever in a case where the first identification information and the second identification information match.

* * * * *